Aug. 1, 1961 R. F. SHELBY 2,994,802
IMAGE-REPRODUCING SYSTEM
Filed Oct. 27, 1958
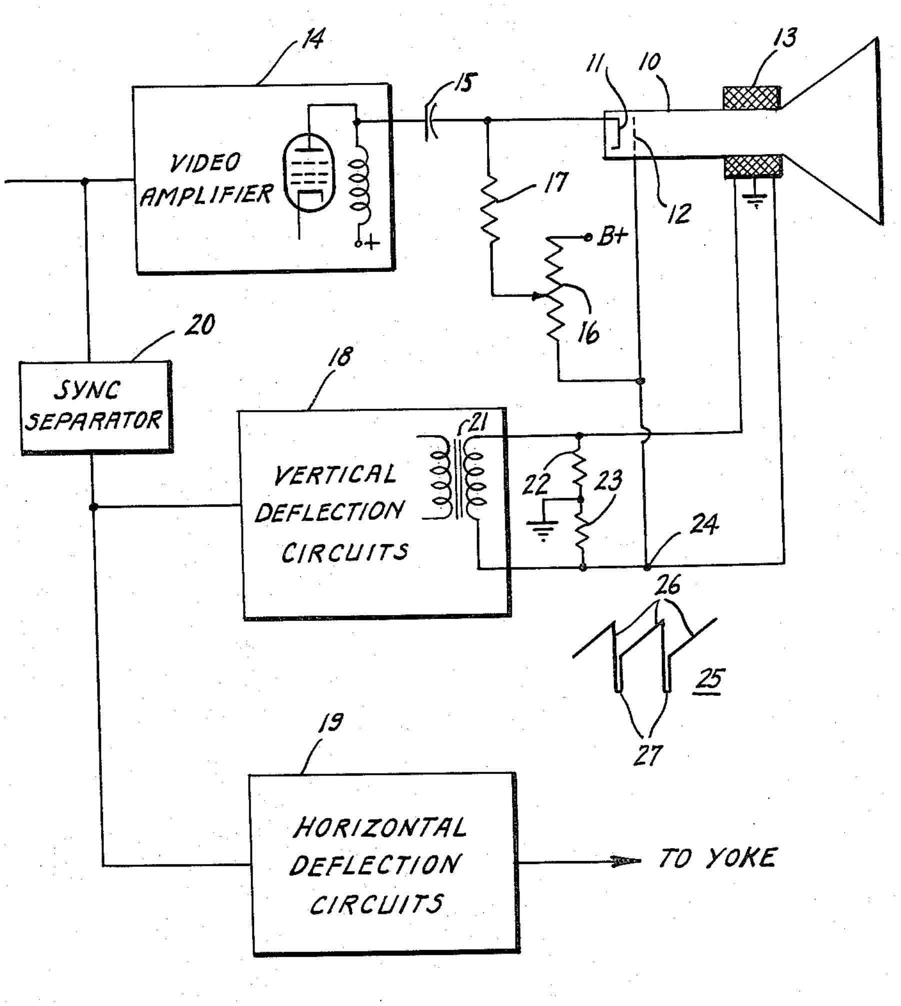
INVENTOR.
RUFUS F. SHELBY
BY
Fordyce A. Bothwell
ATTORNEY 2,994,802

IMAGE-REPRODUCING SYSTEM

Rufus F. Shelby, Philadelphia, Pa., assignor to Philco Corporation, Philadelphia, Pa., a corporation of Pennsylvania Filed Oct. 27, 1958, Ser. No. 769,799
6 Claims. (Cl. 315—22)

This invention relates to image-reproducing systems of the type employed in television receivers, wherein an image is reproduced by modulation of the electron beam within an image-reproducing cathode ray tube, concurrently with deflection of the beam over the screen of said tube. More particularly, the present invention relates to the suppression of visible retrace in such a system.

As is well understood by those skilled in the art, during the blanking or retrace intervals the video signal is blanked out with the intention that no visible retrace lines shall appear on the screen. However, this does not insure the elimination of visible retrace lines because such lines will appear if the brightness control is not correctly adjusted and the electron beam is of sufficient intensity during retrace to produce such lines. Therefore, it has been the practice in the past to employ retrace suppression, utilizing the flyback pulses of the vertical and/or horizontal deflection circuits as suppressor pulses. In each of these circuits a composite voltage is produced having a sawtooth component and a pulse (flyback) component. The composite voltage may be supplied to an electrode of the cathode ray tube so that the pulse component effects reduction of the beam intensity during retrace, but unfortunately the sawtooth component causes undesirable shading during the picture intervals. In the past this objection has been overcome by removing the sawtooth component and supplying only the remaining pulse component to the control grid of the cathode ray tube. However, the removal of the sawtooth component requires the provision of an additional resistance-capacitance network which involves undesirable additional cost.

The principal object of the present invention is to provide a simple retrace suppression arrangement which eliminates the need for such a network, thereby avoiding the additional cost thereof.

This invention is based on the concept that the sawtooth component of the composite voltage need not be removed if it is applied both to the cathode and to a control electrode of the cathode ray tube, since in such case the cathode and the control electrode are equally affected by said component and therefore it does not cause shading of the picture. In accordance with this invention, the composite voltage, including both the sawtooth and pulse components, is applied to one of the electrodes of the cathode ray tube so as to effect visible retrace suppression by the pulse component, and only the sawtooth component is applied to another electrode. This is readily accomplished in a simple manner as hereinafter described.

In the accompanying drawing, the single figure is a diagrammatic illustration of one embodiment of the invention as applied to suppression of vertical retrace.

Referring more particularly to the drawing, a conventional cathode ray tube is represented at 10 having a cathode 11, a control electrode 12, a deflection yoke 13, and other elements (not shown) with which the present invention is not concerned. The video signal is supplied to the cathode 11 from the video amplifier 14 through a capacitor 15. A brightness control potentiometer 16 is connected to the cathode through resistor 17.

The vertical deflection circuits 18 and the horizontal deflection circuits 19 receive the vertical and horizontal sync components of the received composite signal from the sync separator 20 and supply deflection currents to the yoke 13. For example, the vertical output transformer 21 supplies deflection current to the vertical deflection coils which are shunted by resistors 22 and 23. At point 24 there is present a composite voltage 25 having a positive-going sawtooth component 26 and a negative-going (flyback) pulse component 27.

As thus far described the system is conventional. As hereinbefore stated, in the past the flyback pulses of the vertical and/or horizontal deflection circuits have been utilized for visible retrace suppression, and in so doing a resistance-capacitance network has been employed to remove the sawtooth component from the composite pulse-sawtooth voltage, but this has involved objectionable added cost.

The present invention is illustrated in the drawing as applied to the suppression of vertical retrace, although it will be understood that the invention is applicable as well to the suppression of horizontal retrace.

In accordance with this invention, the composite voltage 25 is applied to one electrode of the cathode ray tube, and only the sawtooth component is applied to another electrode of the cathode ray tube. The latter result is achieved by removing the pulses.

In the preferred arrangement illustrated, the composite signal 25 is supplied to the control electrode 12 and also to the brightness control potentiometer 16. Capacitor 15 and resistor 17 remove the pulses so that only the sawtooth component is applied to cathode 11. The pulses supplied to the control electrode serve to reduce the intensity of the electron beam and thus effect suppression of visible retrace. And since the sawtooth component is applied both to the cathode and to the control electrode, it does not produce undesirable shading during the picture interval. That is to say, as the control electrode goes more positive tending to increase the beam intensity, the cathode also goes more positive tending to decrease the beam intensity. The two effects cancel one another, so that during the picture interval the beam intensity is varied only by the video signal.

In the illustrated embodiment, the composite voltage 25 is assumed to be of conventional form in which the flyback pulses are negative going, and therefore the composite voltage including these pulses is supplied to the control electrode. However, if the polarities of the sawtooth and pulse components were reversed, the composite voltage would be supplied to the cathode and only the sawtooth component would be supplied to the control electrode.

From the foregoing description it will be seen that this invention effectively removes the sawtooth component of the composite voltage by a cancellation or nullification arrangement, and thus eliminates the need for employing an additional resistance-capacitance network as in the past.

This invention has been used experimentally in television receivers manufactured by applicant's assignee, and it has proved to be entirely satisfactory.

While a single embodiment of the invention has been illustrated and described, the invention is not limited thereto but contemplates such modifications and further embodiments as may occur to those skilled in the art.

I claim:

1. In an image-reproducing system, an image-reproducing cathode ray tube having an emitter electrode and a control electrode, beam-deflection means wherein there is produced a composite voltage having a sawtooth component and a pulse component of opposite polarities which occur respectively during trace and retrace intervals, means for supplying said composite voltage to one of said electrodes so as to effect visible retrace suppression by said pulse component, said sawtooth component tending to cause undesirable shading of the reproduced image during the trace intervals, and means for supplying only the sawtooth component of said composite voltage to the other of said electrodes, whereby to nullify the effect of the same component applied to the first electrode and thus prevent the undesirable shading of the reproduced image.

2. In an image-reproducing system, an image-reproducing cathode ray tube having a cathode and a control electrode, beam-deflection means wherein there is produced a composite voltage having a positive-going sawtooth component and a negative-going pulse component which occur respectively during trace and retrace intervals, means for supplying said composite voltage to said control electrode to effect visible retrace suppression by said pulse component, said sawtooth component tending to cause undesirable shading of the reproduced image during the trace intervals, and means for supplying only the sawtooth component of said composite voltage to said cathode, whereby to nullify the effect of the same component applied to said control electrode and thus prevent the undesirable shading of the reproduced image.

3. In an image-reproducing system, an image-reproducing cathode ray tube having a cathode and a control electrode, a brightness control potentiometer connected between said cathode and said control electrode, beam-deflection means wherein there is produced a composite voltage having a positive-going sawtooth component and a negative-going pulse component which occur respectively during trace and retrace intervals, means for supplying said composite voltage to said control electrode and to said potentiometer, the sawtooth component applied to said control electrode tending to cause undesirable shading of the reproduced image during the trace intervals, and means for removing the pulse component from the composite voltage supplied to said potentiometer, whereby to supply only the sawtooth component to said cathode and thus nullify the effect of the same component applied to said control electrode, with the result that the undesirable shading of the reproduced image is prevented.

4. In an image-reproducing cathode ray tube system wherein the image is reproduced through trace and retrace movements of an electron beam which is modulated by video signal during the trace intervals, and wherein it is desired to reduce the intensity of said beam during retrace to preclude visibility of retrace, said cathode ray tube having an emitter electrode and a beam-controllable electrode, said system comprising beam-deflection means wherein there is produced a composite voltage having a sawtooth component and a pulse component of opposite polarities which occur respectively during trace and retrace intervals, means for supplying said composite voltage to one of said electrodes so that the pulse component reduces the intensity of said beam during retrace, the sawtooth component tending to produce undesirable shading in the reproduced image during the trace intervals, and means for supplying only the sawtooth component of said composite voltage to the other of said electrodes, whereby to nullify the effect of the same component applied to the first electrode and thereby prevent said undesirable shading in the reproduced image.

5. In an image-reproducing cathode ray tube system wherein the image is reproduced through trace and retrace movements of an electron beam which is modulated by video signal during the trace intervals, and wherein it is desired to reduce the intensity of said beam during retrace to preclude visibility of retrace, said cathode ray tube having a cathode and a beam-controllable electrode, said system comprising beam-deflection means wherein there is produced a composite voltage having a positive-going sawtooth component and a negative-going pulse component which occur respectively during trace and retrace intervals, means for supplying said composite voltage to said beam-controllable electrode, whereby the negative-going pulse component reduces the intensity of said beam during retrace but the positive-going sawtooth component tends to produce undesirable shading in the reproduced image during the trace intervals, and means for supplying only the sawtooth component of said composite voltage to said cathode to nullify the effect of the same component applied to said electrode, thereby preventing said undesirable shading in the reproduced image.

6. An image-reproducing system according to claim 5, wherein said composite voltage is supplied to a path leading to said cathode and the pulse component is removed so that only the sawtooth component reaches the cathode.

References Cited in the file of this patent

UNITED STATES PATENTS

| | | |
|---|---|---|
| 2,688,712 | Procter | Sept. 7, 1954 |
| 2,825,758 | Revercomb | Mar. 4, 1958 |
| 2,862,143 | Wilson | Nov. 25, 1958 |
| 2,884,562 | Solow | Apr. 28, 1959 |